(12) United States Patent
Brohl et al.

(10) Patent No.: US 10,591,100 B2
(45) Date of Patent: Mar. 17, 2020

(54) REFRIGERANT HAMMER ARRESTOR AND REFRIGERANT LOOP INCORPORATING THAT REFRIGERANT HAMMER ARRESTOR

(71) Applicant: FORD GLOBAL TECHNOLOGIES, LLC, Dearborn, MI (US)

(72) Inventors: Kevin James Brohl, Detroit, MI (US); Trent Greear Sutherland, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 206 days.

(21) Appl. No.: 15/813,980

(22) Filed: Nov. 15, 2017

(65) Prior Publication Data

US 2019/0143789 A1    May 16, 2019

(51) Int. Cl.
    *F16L 55/04* (2006.01)
(52) U.S. Cl.
    CPC .......... *F16L 55/043* (2013.01); *F25B 2500/12* (2013.01); *F25B 2500/13* (2013.01); *F25B 2600/2519* (2013.01)
(58) Field of Classification Search
    CPC .............. F25B 2500/13; F25B 2500/12; F25B 2600/2519; F16L 55/043
    See application file for complete search history.

(56) References Cited

U.S. PATENT DOCUMENTS

| | | | |
|---|---|---|---|
| 5,385,035 A | 1/1995 | Nishida et al. | |
| 5,588,590 A | 12/1996 | Sakakibara et al. | |
| 7,739,881 B2 | 6/2010 | Matsunaga et al. | |
| 2006/0086110 A1* | 4/2006 | Manole | F25B 1/10 62/175 |
| 2012/0297809 A1* | 11/2012 | Carpenter | B60L 1/003 62/244 |
| 2013/0333398 A1* | 12/2013 | Wendrock | F25B 39/028 62/56 |

FOREIGN PATENT DOCUMENTS

| | | | |
|---|---|---|---|
| CN | 206131559 U | 4/2017 | |
| JP | H08207554 A | 8/1996 | |
| JP | H0914797 A | 1/1997 | |
| JP | 2008261513 A | 10/2008 | |
| WO | WO-2008013079 A1 * | 1/2008 | F25B 41/00 |

OTHER PUBLICATIONS

English Translation of WO 2008/013079 (Year: 2008).*
English Machine Translation of CN206131559U.
English Machine Translation of JP2008261513A.
English Machine Translation of JPH08207554A.
English Machine Translation of JPH0914797A.

* cited by examiner

*Primary Examiner* — David J Teitelbaum
(74) *Attorney, Agent, or Firm* — David Coppiellie; King & Schickli, PLLC

(57) ABSTRACT

A refrigerant hammer arrestor includes a housing having an internal compartment communicating with a refrigerant line, a piston received in the housing and dividing the internal compartment into a first chamber and a second chamber and a damping mechanism to dampen displacement of the piston within the housing. Various refrigerant loops are also described incorporating a refrigerant hammer arrestor.

11 Claims, 6 Drawing Sheets

REFRIGERANT HAMMER ARRESTOR AND REFRIGERANT LOOP INCORPORATING THAT REFRIGERANT HAMMER ARRESTOR

TECHNICAL FIELD

This document relates generally to climate control systems and, more particularly, to a refrigerant hammer arrestor and a refrigerant loop incorporating that refrigerant hammer arrestor. Such technology may be incorporated into a motor vehicle.

BACKGROUND

A fluid hammer is a pressure surge or wave caused when a fluid in motion is forced to stop or change direction suddenly. For example, a closing valve in a fluid system such as a refrigerant loop may cause a fluid hammer pulse to take place. The compressing action of a compressor in a refrigerant loop may also create pressure pulses in the system. These pressure waves have the potential to create noise and vibration issues that may be a nuisance to a motor vehicle operator and may in some instances lead to durability issues. In some cases, the pressure pulse may trip the pressure sensor on a compressor and force the compressor to shut down prematurely.

This document relates to a new and improved refrigerant hammer arrestor that dissipates and in many instances completely eliminates a fluid hammer thereby attenuating noise and vibration issues and enhancing the durability of a climate control system.

SUMMARY

In accordance with the purposes and benefits described herein, a refrigerant hammer arrestor is provided. That refrigerant hammer arrestor comprises a housing, including an internal compartment communicating with a refrigerant line, a piston received in that housing and dividing the internal compartment into a first chamber and a second chamber and a damping mechanism to dampen displacement of the piston within the housing.

The damping mechanism may comprise an electromechanical damping mechanism, a fluid damping mechanism, a mechanical damping mechanism and combinations thereof. More specifically, the damping mechanism may comprise a piezoelectric material, a magnetic fluid, a variable magnetic repulsion device, an air damping fluid, a liquid damping fluid, a gaseous damping fluid, a spring, a rubber damping element, a foam damping element and combinations thereof.

In accordance with an additional aspect, a refrigerant loop is provided incorporating the refrigerant hammer arrestor.

In one or more possible embodiments, the refrigerant loop comprises a compressor, a condenser downstream from the compressor, a first expansion device downstream from the condenser, a first evaporator between the first expansion device and the compressor, a first shutoff valve between the condenser and the first evaporator and a first refrigerant hammer arrestor between the first shutoff valve and the condenser.

The first refrigerant hammer arrestor may include a housing including an internal compartment communicating with a refrigerant line. The first refrigerant hammer arrestor may also include a piston received in the housing and dividing the internal compartment into a first chamber and a second chamber. Further, the first refrigerant hammer arrestor may include a damping mechanism to dampen displacement of the piston within the housing.

That damping mechanism may comprise an electromechanical damping mechanism, a fluid damping mechanism, a mechanical damping mechanism and combinations thereof. More specifically, the damping mechanism may comprise a piezoelectric material, a magnetic fluid, a variable magnetic repulsion device, an air damping fluid, a liquid damping fluid, a gaseous damping fluid, a spring, a rubber damping element, a foam damping element and combinations thereof.

In one or more possible embodiments, the refrigerant loop may further include an internal heat exchanger between the first refrigerant hammer arrestor and the condenser.

In one or more embodiments, the refrigerant loop may further include a second evaporator, a second expansion device and a second shutoff valve between the condenser and the compressor and in parallel with the first evaporator, the first expansion device and the first shutoff valve. In one or more embodiments, the first refrigerant hammer arrestor may also be provided between the second shutoff valve and the condenser.

In still other possible embodiments, the refrigerant loop may include a battery chiller, a battery chiller expansion device and a battery chiller shutoff valve between the condenser and the compressor and in parallel with the first evaporator, the first expansion device and the first shutoff valve. In one or more possible embodiments, the refrigerant loop may further include a second refrigerant hammer arrestor. That second refrigerant hammer arrestor may be provided between the battery chiller shutoff valve and the condenser.

In accordance with yet another possible aspect, a refrigerant loop comprises a compressor, a condenser downstream from the compressor, a battery chiller expansion device downstream from the condenser, a battery chiller between the battery chiller expansion device and the compressor, a battery chiller shutoff valve between the condenser and the battery chiller and a battery chiller refrigerant hammer arrestor between the battery chiller shutoff valve and the condenser.

The battery chiller refrigerant hammer arrestor may include a housing having an internal compartment communicating with a refrigerant line. The battery chiller refrigerant hammer arrestor may also include a piston received in the housing and dividing the internal compartment into a first chamber and a second chamber. Further, the battery chiller refrigerant hammer arrestor may include a damping mechanism to dampen displacement of the piston within the housing.

The damping mechanism may comprise an electromechanical damping mechanism, a fluid damping mechanism, a mechanical damping mechanism and combinations thereof. More specifically, the damping mechanism may comprise a piezoelectric material, a magnetic fluid, a variable magnetic repulsion device, an air damping fluid, a liquid damping fluid, a gaseous damping fluid, a spring, a rubber damping element, a foam damping element and combinations thereof.

The refrigerant loop may further include a first shutoff valve, a first expansion device and a first evaporator between the condenser and the compressor. In addition, in one or more embodiments, the refrigerant loop may further include a second shutoff valve, a second expansion device and a second evaporator between the condenser and the compressor and in parallel to the first shutoff valve, the first expansion device and the first evaporator. Still further, in one or more embodiments, the refrigerant loop may further include a first refrigerant hammer arrestor between (a) the condenser and (b) the first shutoff valve and the second shutoff valve.

In the following description, there are shown and described several preferred embodiments of the refrigerant hammer arrestor and the refrigerant loop incorporating that refrigerant hammer arrestor. As it should be realized, the refrigerant hammer arrestor and the refrigerant loop are capable of other, different embodiments and their several details are capable of modification in various, obvious aspects all without departing from the refrigerant hammer arrestor and refrigerant loop as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the refrigerant hammer arrestor and the refrigerant loop incorporating a refrigerant hammer arrestor and together with the description serve to explain certain principles thereof.

Figure 2:
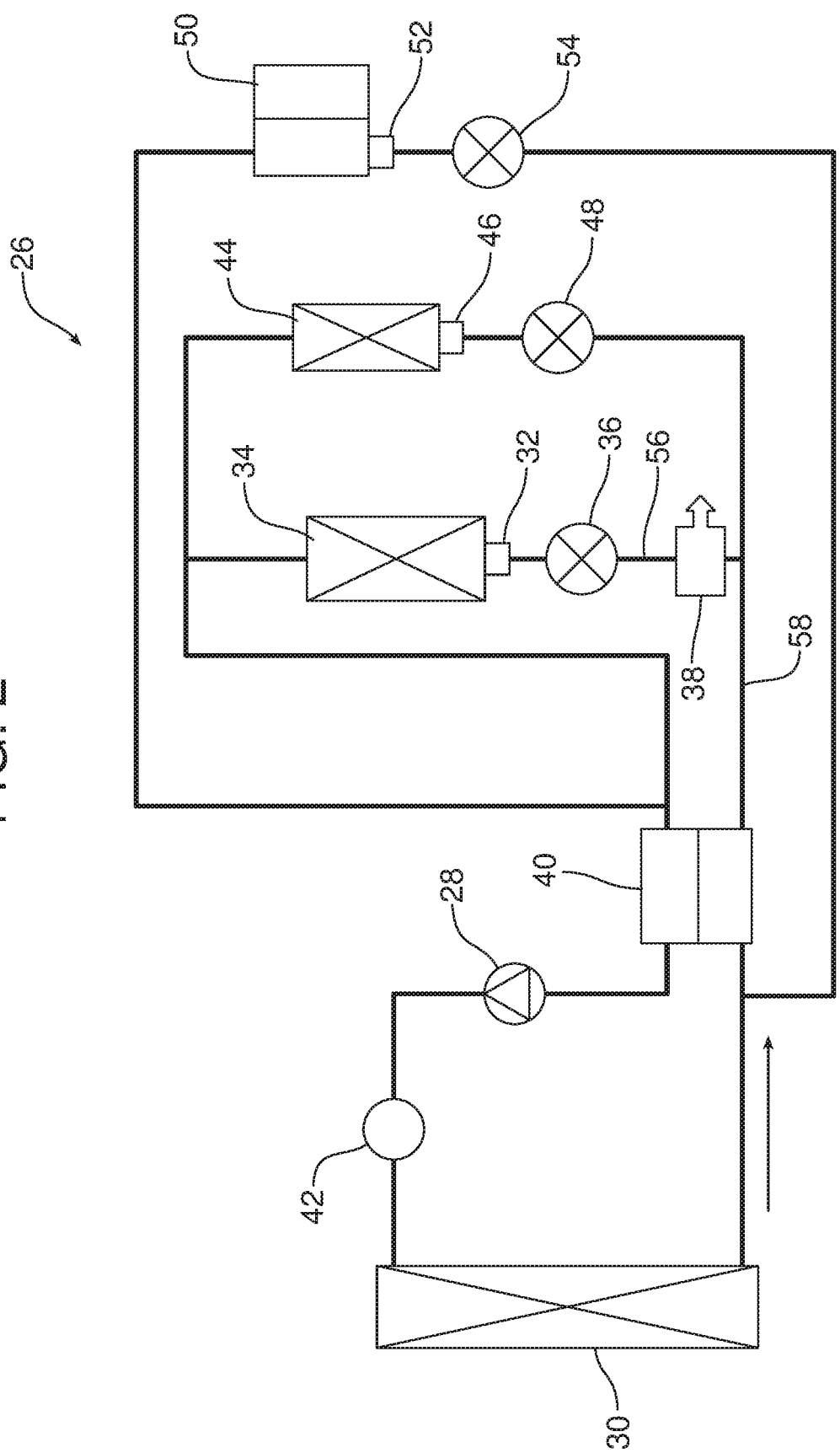
FIGS. 2-6 illustrate various refrigerant loop embodiments incorporating a refrigerant hammer arrestor such as the refrigerant hammer arrestor set forth in FIG. 1.

More specifically, FIG. 2 illustrates a first embodiment of a refrigerant loop with a refrigerant hammer arrestor downstream from a condenser and upstream from a first shutoff valve leading to a first evaporator.

Figure 3:
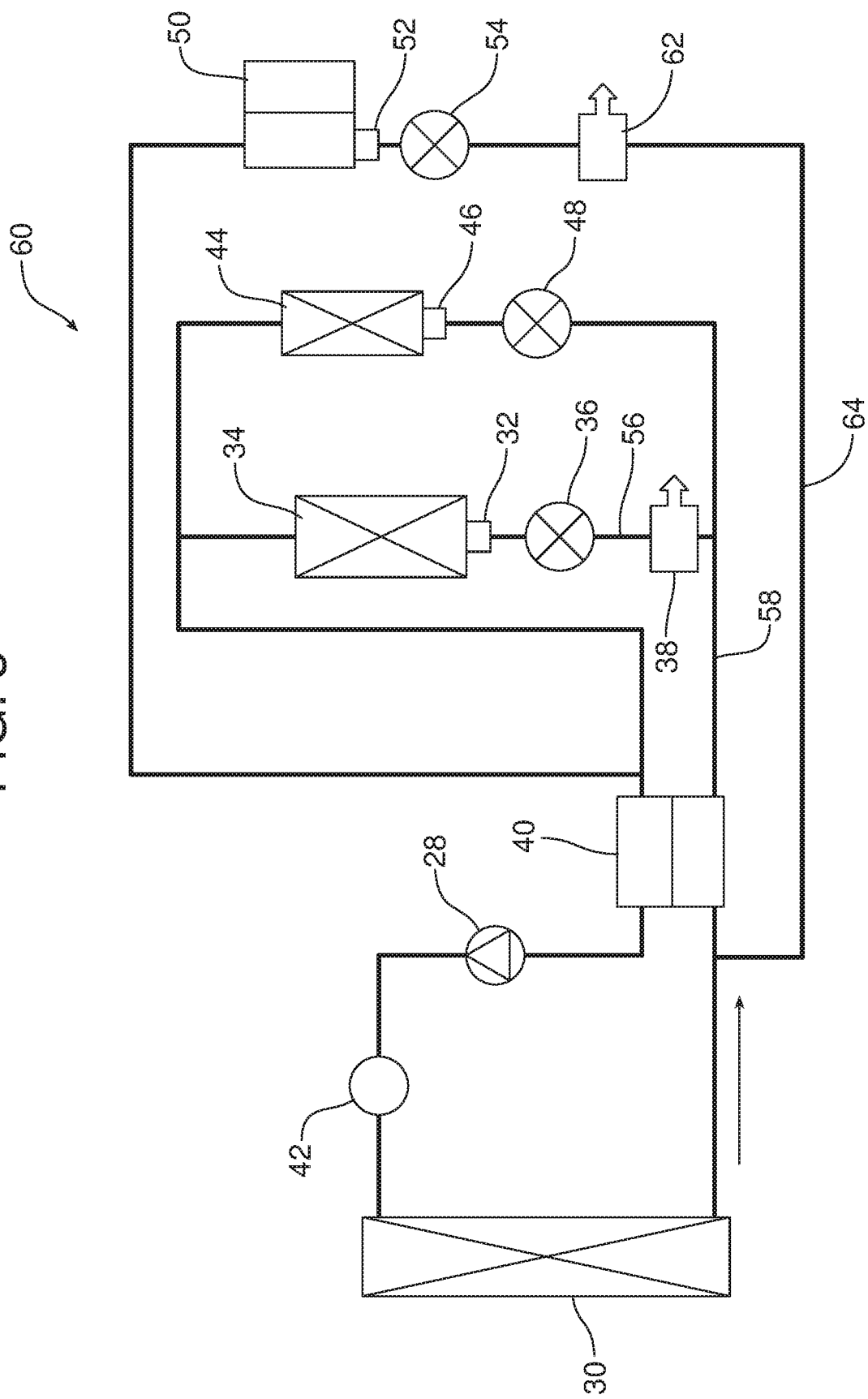

FIG. 3 is a schematic illustration of a second embodiment of a second refrigerant loop including a first hammer arrestor downstream from a condenser and upstream from a first shutoff valve leading to a first evaporator and a battery chiller refrigerant hammer arrestor downstream from the condenser and upstream from a battery chiller shutoff valve leading to a battery chiller.

Figure 4:
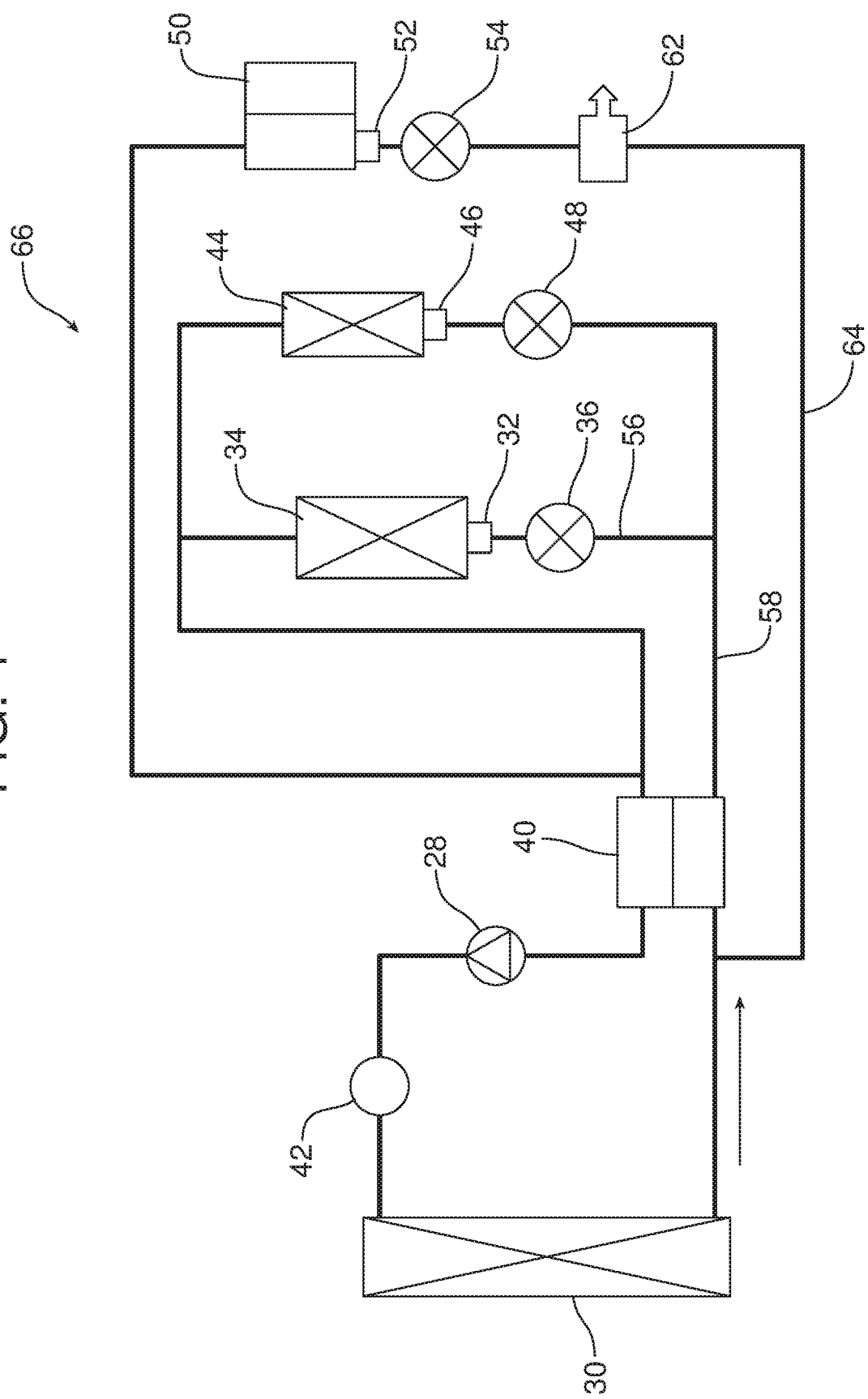

FIG. 4 is a schematic illustration of a third embodiment of a refrigerant loop including a refrigerant hammer arrestor downstream from a condenser and upstream from a battery chiller shutoff valve leading to a battery chiller.

Figure 5:
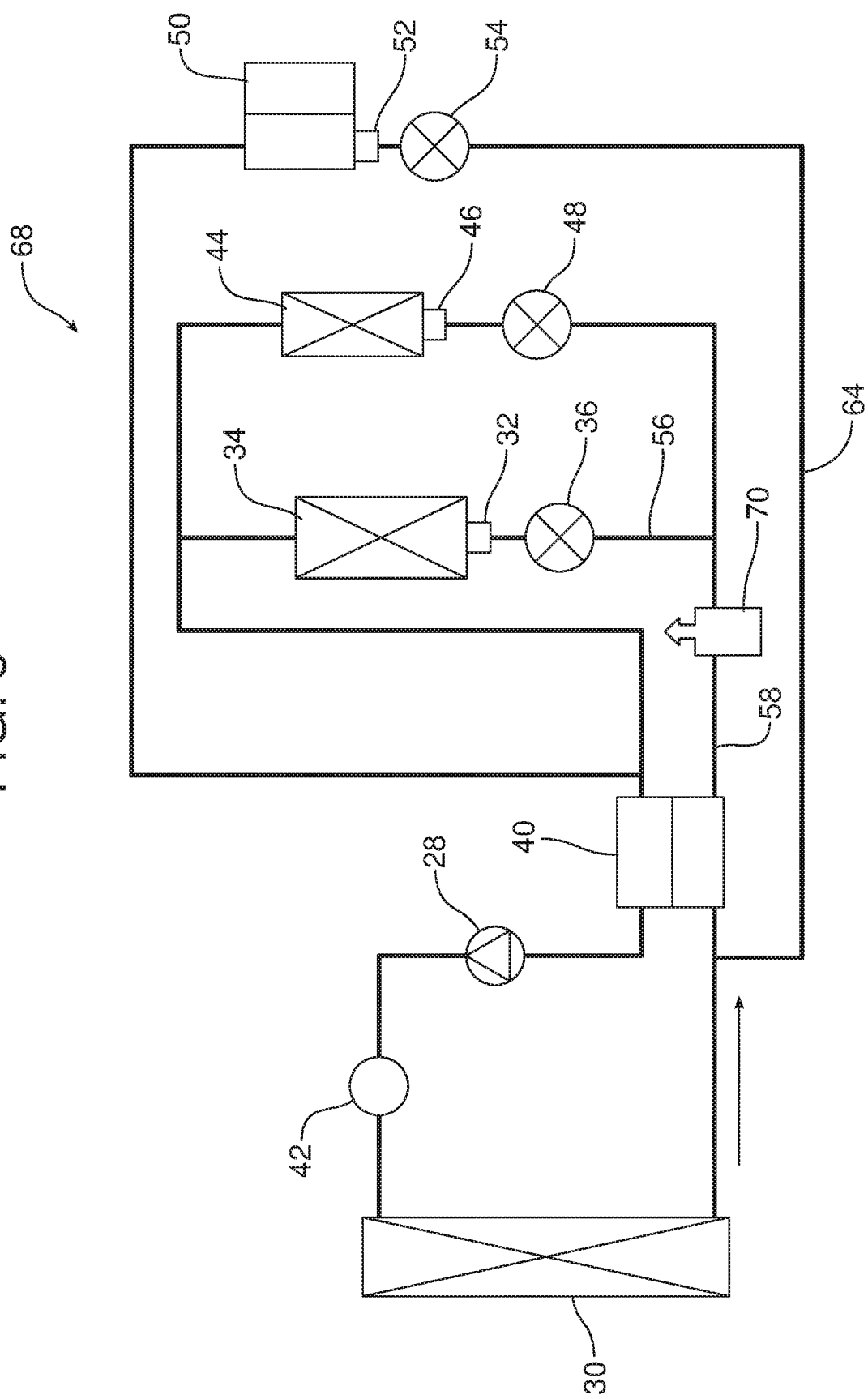

FIG. 5 is a schematic illustration of a fourth embodiment of a refrigerant loop incorporating a refrigerant hammer arrestor downstream from the condenser and upstream from first and second shutoff valves leading to first and second evaporators.

Figure 6:
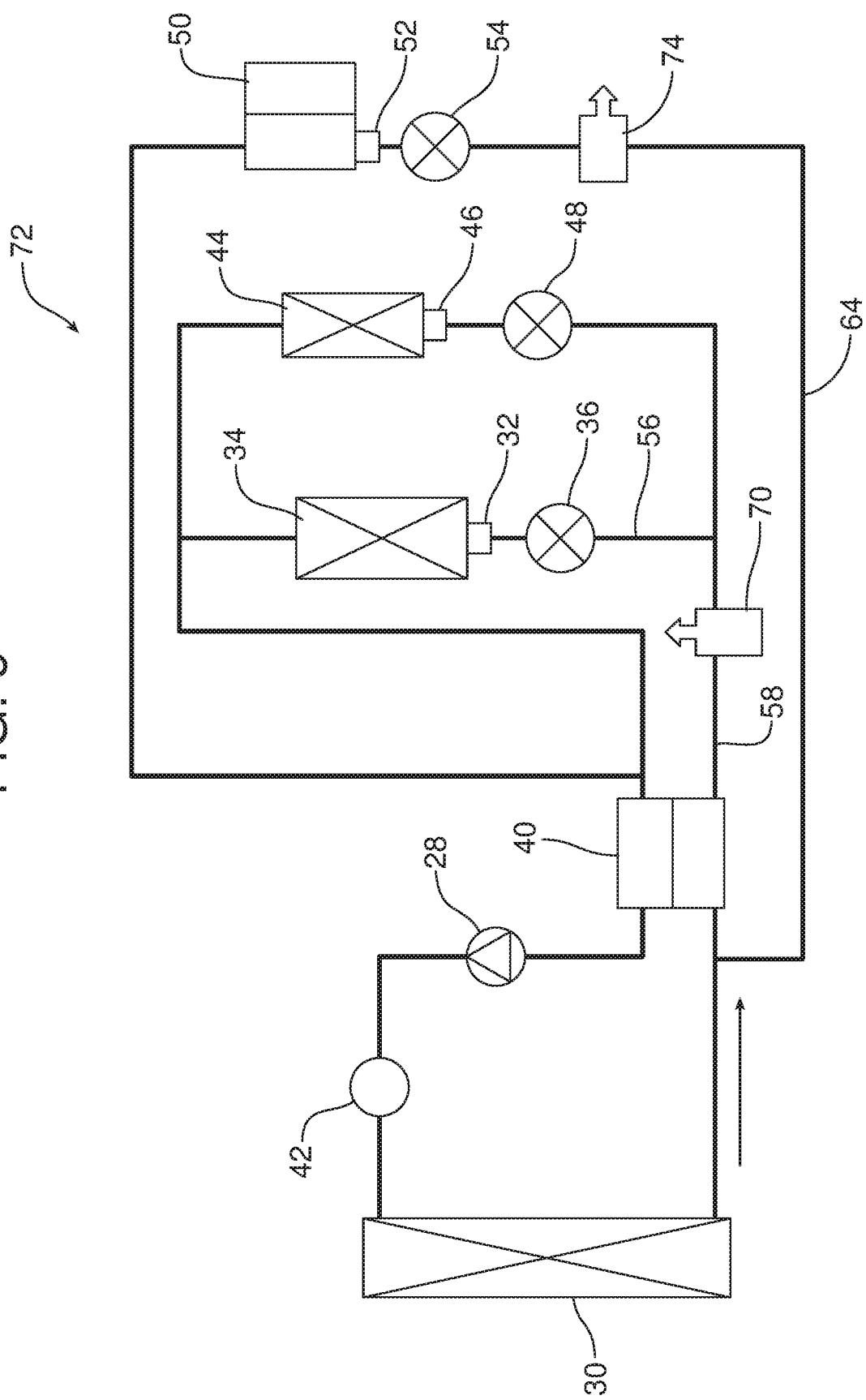

FIG. 6 is a schematic illustration of a fifth embodiment of a refrigerant loop incorporating a refrigerant hammer arrestor downstream from a condenser and upstream from first and second shutoff valves leading to first and second evaporators as well as a battery chiller refrigerant hammer arrestor downstream from the condenser and upstream from a battery chiller shutoff valve leading to a battery chiller.

Reference will now be made in detail to the present preferred embodiments of refrigerant hammer arrestor and the refrigerant loop incorporating a refrigerant hammer arrestor, examples of which are illustrated in the accompanying drawing figures.

DETAILED DESCRIPTION

Figure 1:
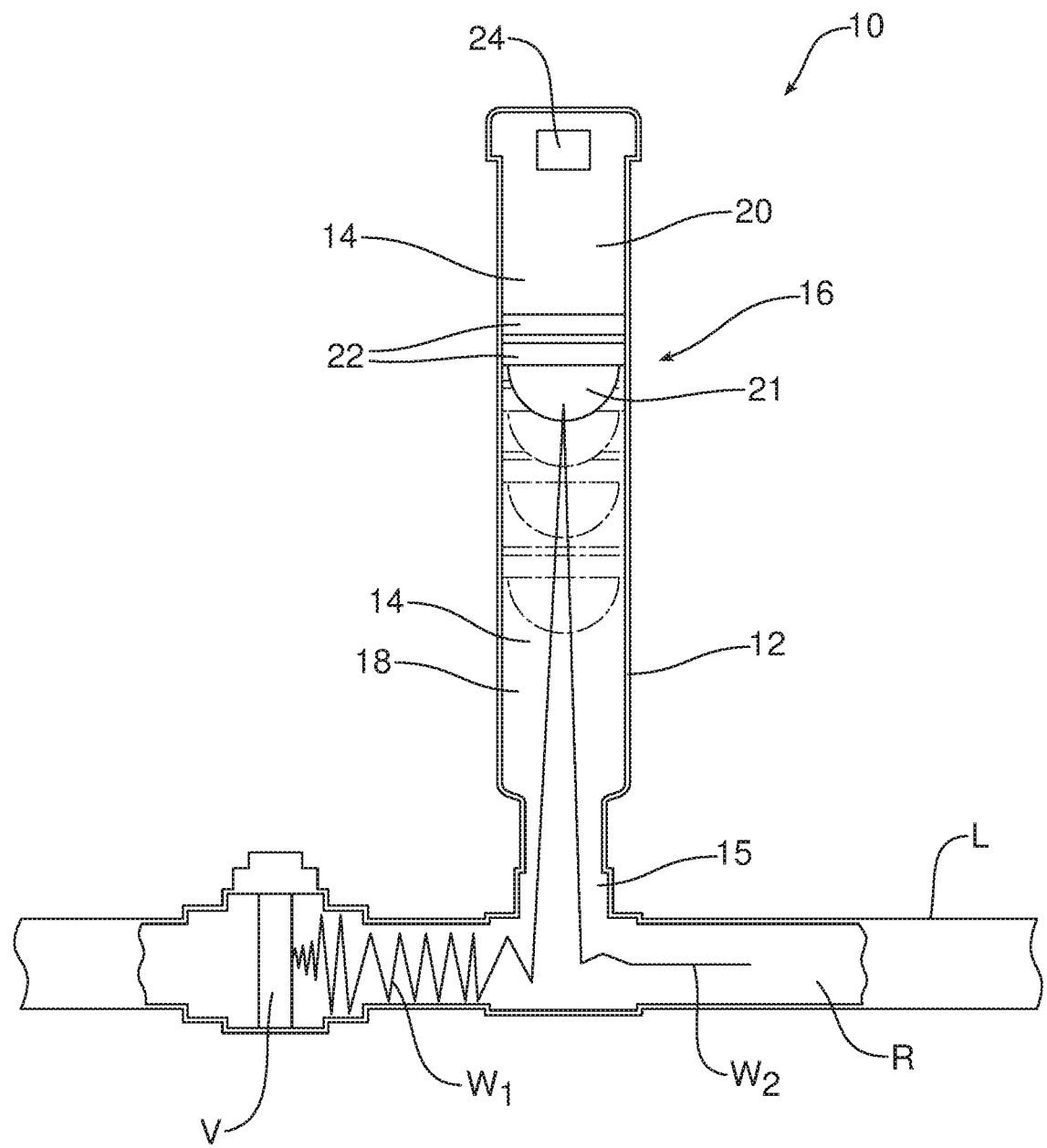
FIG. 1 is a schematic illustration of the new and improved refrigerant hammer arrestor.

Reference is now made to FIG. 1 schematically illustrating a new and improved refrigerant hammer arrestor 10. That refrigerant hammer arrestor 10 includes a housing 12. The housing 12 includes an internal compartment 14. In the illustrated embodiment the internal compartment 14 communicates through an open end 15 with a refrigerant line L upstream from a shutoff valve V. A piston 16 is received in the housing 12. The piston 16 divides the internal compartment 14 into a first chamber 18 and a second chamber 20. In the illustrated embodiment, the piston 16 includes a hemispherical face 21 and two piston rings 22 for providing smooth sliding action along the internal wall of the housing 12.

A damping mechanism, generally designated by reference numeral 24, is provided to dampen displacement of the piston 16 within the housing 12. In the illustrated embodiment, the damping mechanism 24 is provided in the second chamber 20.

The damping mechanism 24 is preferably a variable damping mechanism that may be electrical, mechanical, magnetic or fluid dynamic in nature. Thus, for example, the damping mechanism 24 may comprise, an electromechanical damping mechanism, a fluid damping mechanism, a mechanical damping mechanism and combinations thereof. More specifically, the damping mechanism may comprise, but is not necessarily limited to any one or more of the following: a piezoelectric material, a magnetic fluid, a variable magnetic repulsion device, an air damping fluid, a liquid damping fluid (such as a refrigerant), a gaseous damping fluid (such as nitrogen), a spring, a rubber damping element and a foam damping element.

The refrigerant hammer arrestor 10 illustrated in FIG. 1 is particularly suited and adapted to dissipate or arrest a fluid hammer or pressure surge or wave caused when refrigerant in motion in the refrigerant line L is forced to stop or change direction suddenly in response to operation of the shutoff valve V. In effect, the refrigerant hammer arrestor 10 is a pressure vessel which dampens refrigerant pressure spikes/variations due to operation of refrigerant flow control devices in the refrigerant loop or the refrigerant line L. Thus, for example, when the shutoff valve V is closed, a shockwave $W_1$ is generated in the refrigerant R in the refrigerant line L. The piston 16 responds to the shockwave $W_1$, absorbing the shockwave due to operation of the damping mechanism 24 and thereby effectively dissipating the shockwave as shown at $W_2$.

The refrigerant hammer arrestor 10 may be incorporated into substantially any refrigerant loop in order to reduce noise, enhance the service life and extend the durability of the refrigerant loop of a climate control system. This includes a refrigerant loop and climate control system incorporated into a motor vehicle.

Reference is now made to FIGS. 2-6 illustrating various embodiments of refrigerant loops incorporating a refrigerant hammer arrestor such as the refrigerant hammer arrestor 10 illustrated in FIG. 1.

FIG. 2 illustrates a first embodiment of a refrigerant loop 26. Refrigerant loop 26 includes a compressor 28, a condenser 30 downstream from the compressor, a first expansion device 32 downstream from the condenser and a first evaporator 34 between the first expansion device and the compressor. A first shutoff valve 36 is provided between the condenser 30 and the first evaporator 34. A first refrigerant hammer arrestor 38 is provided between the first shutoff valve 36 and the condenser 30. That first refrigerant hammer arrestor 38 may correspond to the refrigerant hammer arrestor 10 illustrated in FIG. 1.

As further illustrated in FIG. 2, the refrigerant loop 26 may also include an internal heat exchanger 40 between the first refrigerant hammer arrestor 38 and the condenser 30 and between the first evaporator 34 and the compressor 28. The internal heat exchanger 40 helps increase the sub cooling of the condenser 30 and the superheat of the first evaporator 34 so that no refrigerant liquid enters the compressor 28.

The refrigerant loop 26 may also include a pressure sensor 42 for monitoring the pressure of the refrigerant in the refrigerant loop. Still further, the refrigerant loop 26 may include a second evaporator 44, a second expansion device 46 and a second shutoff valve 48 between the condenser 30 and the compressor 28 and in parallel with the first evaporator 34, the first expansion device 32 and the first shutoff valve 36.

Still further, the refrigerant loop 26 illustrated in FIG. 2 includes a battery chiller 50, a battery chiller expansion device 52 and a battery chiller shutoff valve 54 between the condenser 30 and the compressor 28 and in parallel with the first evaporator 34, the first expansion device 32 and the first shutoff valve 36 as well as the second evaporator 44, the second expansion device 46 and the second shutoff valve 48.

In the refrigerant loop 26 illustrated in FIG. 2, the first refrigerant hammer arrestor 38 is in the refrigerant feed line 56 leading to the first shutoff valve 36, first expansion device 32 and first evaporator 34 from the common refrigerant feed line 58 leading from the condenser 30 to both the (a) first shutoff valve 36, the first expansion device 32, the first evaporator 34 and (b) the second shutoff valve 48, the second expansion device 46 and the second evaporator 44.

As the first shutoff valve 36 is opened and closed to control the flow of refrigerant in the refrigerant loop 26 to the first expansion device 32 and first evaporator 34, the refrigerant hammer arrestor 38 is ideally positioned to dissipate or attenuate any shockwave or fluid hammer generated in the refrigerant by that action.

FIG. 3 illustrates a second embodiment of a refrigerant loop 60 having an architecture very similar to refrigerant loop 26 illustrated in FIG. 2. For purposes of brevity and simplicity of description, like structures include identical reference numbers.

The refrigerant loop 60 illustrated in FIG. 3 differs from the refrigerant loop 26 illustrated in FIG. 2 in one respect: that is, a battery chiller refrigerant hammer arrestor 62 is provided in the refrigerant feed line 64 leading from the condenser 30 to the battery chiller shutoff valve 54, the battery chiller expansion device 52 and the battery chiller 50. The battery chiller refrigerant hammer arrestor 62 may comprise a refrigerant hammer arrestor 10 of the type illustrated in FIG. 1.

It should be appreciated that the battery chiller refrigerant hammer arrestor 62 is ideally positioned in the refrigerant feed line 64 adjacent the battery chiller shutoff valve 54 to dissipate or arrest any fluid hammer pressure surge or wave caused in the refrigerant when the battery chiller shutoff valve 54 is opened or closed.

Reference is now made to FIG. 4 illustrating yet another refrigerant loop 66. For purposes of brevity, once again like structures are identified by the same reference numbers. The refrigerant loop 66 differs from the refrigerant loop 60 illustrated in FIG. 3 by the elimination of the refrigerant hammer arrestor 38. Thus, the refrigerant loop 66 includes only one refrigerant hammer arrestor, the battery chiller refrigerant hammer arrestor 62 for arresting or dissipating the fluid hammer, pressure surge or wave caused when the battery chiller shutoff valve 54 is opened or closed to control the flow of refrigerant to the battery chiller expansion device 52 and the battery chiller 50.

FIG. 5 illustrates yet another possible embodiment of a refrigerant loop 68. Once again, like structures with identical functions are identified by the same reference number and for purposes of brevity are not described again in detail. In this embodiment, the refrigerant hammer arrestor 70 is provided in the common refrigerant feed line 58 upstream from both (a) the first shutoff valve 36 for controlling the flow of refrigerant to the first expansion device 32 and the first evaporator 34 and (b) the second shutoff valve 48 which controls the flow of refrigerant to the second expansion device 46 and the second evaporator 44. In this position, the single refrigerant hammer arrestor 70 is ideally positioned to arrest or dissipate any fluid hammer or pressure surge or wave generated when either of the first shutoff valve 36 or the second shutoff valve 48 are opened or closed to control the flow of refrigerant to the corresponding first evaporator 34 and second evaporator 44. Here it should be appreciated that the refrigerant hammer arrestor 70 may correspond in structure to the refrigerant hammer arrestor 10 illustrated in FIG. 1.

FIG. 6 illustrates yet another possible embodiment of a refrigerant loop 72. Refrigerant loop 72 is identical to refrigerant loop 68 illustrated in FIG. 5 with one exception: the provision of a battery chiller refrigerant hammer arrestor 74 in the refrigerant feed line 64 leading to the battery chiller shutoff valve 54, the battery chiller expansion device 52 and the battery chiller 50. Thus, the battery chiller refrigerant hammer arrestor 74 is provided downstream from the condenser 30 and upstream from the battery chiller shutoff valve 54 where it is ideally positioned to arrest or dissipate any fluid hammer, pressure surge or wave generated when the battery chiller shutoff valve 54 is opened or closed to control the flow of refrigerant to the battery chiller expansion device 52 and battery chiller 50.

At the same time, the refrigerant hammer arrestor 70 provided in the common refrigerant feed line 58 leading from the condenser 30 to the first evaporator 34 and second evaporator 44 is ideally positioned to dissipate any fluid hammer, pressure surge or wave generated in the refrigerant when either the first shutoff valve 36 is opened or closed to control the flow of refrigerant to the first expansion device 32 and the first evaporator 34 or the second shutoff valve 48 is opened or closed to control the flow of refrigerant to the second expansion device 46 and second evaporator 44.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A refrigerant loop, comprising:
   a compressor;
   a condenser downstream from said compressor;
   a first expansion device downstream from said condenser;
   a first evaporator between said first expansion device and said compressor;
   a first shutoff valve between said condenser and said first evaporator;
   a first refrigerant hammer arrestor between said first shutoff valve and said condenser;
   a battery chiller, a battery chiller expansion device and a battery chiller shutoff valve between said condenser and said compressor and in parallel with said first evaporator, said first expansion device and said first shutoff valve; and a second refrigerant hammer arrestor between said battery chiller shutoff valve and said condenser.

2. The refrigerant loop of claim 1, wherein said first refrigerant hammer arrestor includes a housing including an internal compartment communicating with a refrigerant line;
 a piston received in said housing and dividing said internal compartment into a first chamber and a second chamber; and
 a damping mechanism to dampen displacement of said piston within said housing.

3. The refrigerant loop of claim 2, wherein said damping mechanism is selected from a group of damping mechanisms consisting of an electromechanical damping mechanism, a fluid damping mechanism, a mechanical damping mechanism and combinations thereof.

4. The refrigerant loop of claim 2, wherein said damping mechanism is selected from a group of damping mechanisms consisting of a piezoelectric material, a magnetic fluid, an air damping fluid, a liquid damping fluid, a gaseous damping fluid, a spring, a rubber damping element, a foam damping element and combinations thereof.

5. The refrigerant loop of claim 1, further including an internal heat exchanger between said first refrigerant hammer arrestor and said condenser and between said first evaporator and said compressor.

6. The refrigerant loop of claim 1, further including a second evaporator, a second expansion device and a second shutoff valve between said condenser and said compressor and in parallel with said first evaporator, said first expansion device and said first shutoff valve.

7. The refrigerant loop of claim 6, wherein said first refrigerant hammer arrestor is also between said second shutoff valve and said condenser.

8. A refrigerant loop, comprising:
 a compressor;
 a condenser downstream from said compressor;
 a battery chiller expansion device downstream from said condenser;
 a battery chiller between said battery chiller expansion device and said compressor;
 a battery chiller shutoff valve between said condenser and said battery chiller;
 a battery chiller refrigerant hammer arrestor between said battery chiller shutoff valve and said condenser wherein said battery chiller refrigerant hammer arrestor includes a housing including an internal compartment communicating with a refrigerant line, a piston received in said housing and dividing said internal compartment into a first chamber and a second chamber and a damping mechanism to dampen displacement of said piston within said housing;
 a first shutoff valve, a first expansion device and a first evaporator between said condenser and said compressor; and
 a second shutoff valve, a second expansion device and a second evaporator between said condenser and said compressor and parallel to said first shutoff valve, said first expansion device and said first evaporator.

9. The refrigerant loop of claim 8, wherein said damping mechanism is selected from a group of damping mechanisms consisting of an electromechanical damping mechanism, a fluid damping mechanism, a mechanical damping mechanism and combinations thereof.

10. The refrigerant loop of claim 8, wherein said damping mechanism is selected from a group of damping mechanisms consisting of a piezoelectric material, a magnetic fluid, an air damping fluid, a liquid damping fluid, a gaseous damping fluid, a spring, a rubber damping element, a foam damping element and combinations thereof.

11. The refrigerant loop of claim 8, further including a first refrigerant hammer arrestor between (a) said condenser and (b) said first shutoff valve and said second shutoff valve.

* * * * *